US011519345B2

(12) United States Patent
Gysi et al.

(10) Patent No.: US 11,519,345 B2
(45) Date of Patent: Dec. 6, 2022

(54) DYNAMIC LOADS BASED ON FUEL TYPE

(71) Applicant: Kohler Co., Kohler, WI (US)

(72) Inventors: William Gysi, Sheboygan, WI (US); Peter Thompson, Kohler, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 16/701,395

(22) Filed: Dec. 3, 2019

(65) Prior Publication Data

US 2021/0164408 A1 Jun. 3, 2021

(51) Int. Cl.
*F02D 19/06* (2006.01)
*F02D 41/00* (2006.01)
*F02D 19/08* (2006.01)

(52) U.S. Cl.
CPC ..... *F02D 19/0647* (2013.01); *F02D 41/0027* (2013.01); *F02D 19/061* (2013.01); *F02D 19/0631* (2013.01); *F02D 19/0689* (2013.01); *F02D 19/0692* (2013.01); *F02D 19/081* (2013.01); *F02D 2200/0602* (2013.01); *F02D 2200/0612* (2013.01)

(58) Field of Classification Search
CPC ............. F02D 19/0647; F02D 41/0027; F02D 19/061; F02D 19/0631; F02D 19/0689; F02D 19/0692; F02D 19/081; F02D 2200/0602; F02D 2200/0612; H02P 9/04; H02P 9/007; H02P 9/48
See application file for complete search history.

(56) References Cited

U.S. PATENT DOCUMENTS

| | | | |
|---|---|---|---|
| 4,731,547 A * | 3/1988 | Alenduff | H02J 3/48 700/297 |
| 5,868,162 A | 2/1999 | Dickerson, Jr. | |
| 6,223,769 B1 | 5/2001 | Bragg | |
| 6,652,330 B1 | 11/2003 | Wasilewski | |
| 7,228,841 B2 | 6/2007 | Takemoto | |
| 7,356,384 B2 | 4/2008 | Gull | |
| 8,151,780 B2 * | 4/2012 | Douzono | F02D 41/064 123/3 |
| 8,342,274 B2 | 1/2013 | Imamura | |
| 9,046,049 B2 | 6/2015 | Jeon | |
| 2004/0139943 A1 * | 7/2004 | Kern | F02B 43/00 123/198 D |
| 2013/0239845 A1 * | 9/2013 | Frazier | B61C 17/02 105/27 |

(Continued)

FOREIGN PATENT DOCUMENTS

| | | |
|---|---|---|
| CN | 204572217 U | 8/2015 |
| DE | 102015212244 A1 | 1/2017 |
| EP | 1323975 B1 | 3/2005 |

(Continued)

*Primary Examiner* — Syed O Hasan
(74) *Attorney, Agent, or Firm* — Lempia Summerfield Katz LLC

(57) ABSTRACT

A system and method for dynamically controlling an aggregate load on a generator is described. Fuel change data for a gaseous fuel for the generator is identified. The fuel change data indicates a change in fuel type for the generator. A controller identifies at least one load portion from the aggregate load associated with the change in fuel type and generates a switch command for a switch coupled to the at least one load in response to the change in fuel type.

17 Claims, 8 Drawing Sheets

(56) References Cited

U.S. PATENT DOCUMENTS

2015/0357952 A1* 12/2015 Taylor ..................... H02P 9/04
                                                                                                290/40 C
2019/0242309 A1* 8/2019 Mohammed ........ F02D 19/0647

FOREIGN PATENT DOCUMENTS

| JP | H09117062 | * | 5/1997 |
| JP | 2015068334 A | | 4/2015 |
| KR | 1020120127029 A | | 11/2012 |
| RU | 1815372 C | | 5/1993 |

* cited by examiner

DYNAMIC LOADS BASED ON FUEL TYPE

FIELD

This application relates to the field of generators operable with different types of fuel, and more specifically, to dynamic loads based on fuel type.

BACKGROUND

An internal combustion engine converts potential chemical energy in the form of a fuel into mechanical energy. The mechanical energy may be applied to an alternator (or generator) for generating electrical energy, which is stored or delivered as electricity. Various fuels are available for internal combustion engines. Some recent developments have focused on alternatives to gasoline and other conventional fuels as efforts toward cleaner burning engines have gained momentum.

Other types of fuels, such as gaseous fuels, provide numerous advantages over conventional fuels. Gaseous fuels may produce less emission. Gaseous fuels may cost less for the consumer. Gaseous fuels also present additional considerations in the design of internal combustion engines to optimize energy efficiency, exhaust production, and versatility. One area in which gaseous fuels have presented opportunities for improvements is the coordination of generator operation based on the type of fuel supplied to the engine associated with the generator.

BRIEF DESCRIPTION OF THE DRAWINGS

Exemplary embodiments are described herein with reference to the following drawings.

DETAILED DESCRIPTION

The following embodiments include a system for dynamically controlling loads on a generator in response to a type of fuel that is detected for an engine associated with the generator. Dynamically controlling loads may be defined as causing one or more loads to be removed from electrical connection with the generator or brought into connection with the generator, which may be implemented through closing or opening a breaker for the load, or another device for connecting and disconnecting an electrical circuit.

Figure 1:
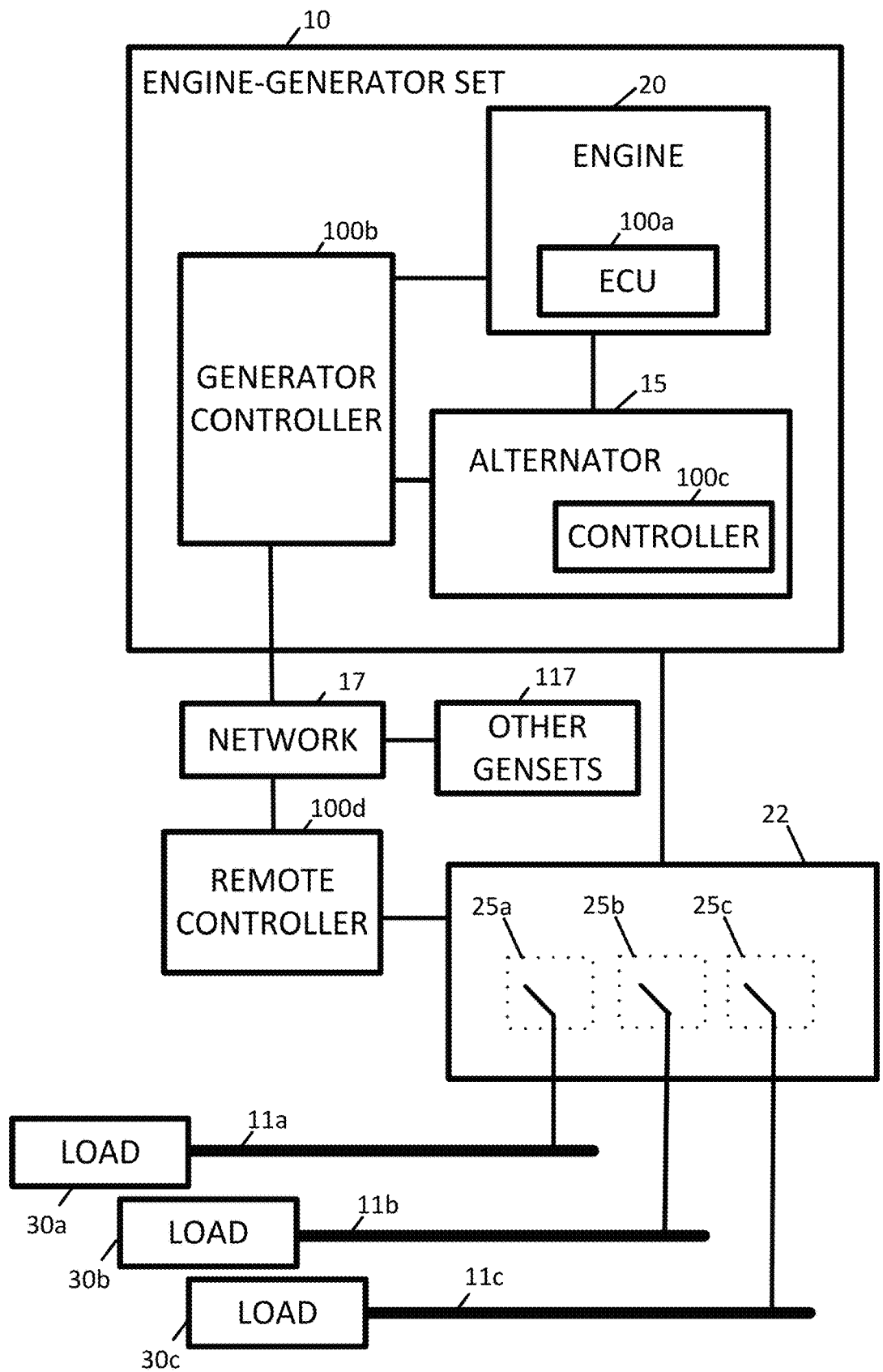
FIG. 1 illustrates a block diagram for a system for dynamically controlling multiple loads on a generator.

FIG. 1 illustrates a block diagram for a system for dynamically controlling a load on an engine-generator set 10, which may be referred to a genset. The genset 10 may include an alternator 15 coupled to an engine 20. The system includes a controller for dynamically connecting loads to the genset 10 through one or more switches or breakers 25a-c and the generator bus 11a-c. The generator bus is an electrically conductive path and may be selectively connected through multiple circuit breakers or other types of switches to the generators, the utility system, and other devices. The controller may be any of the controllers in FIG. 1 operation individually or in collaboration. The phrases "coupled with" or "coupled to" as used herein include directly connected to or indirectly connected through one or more intermediate components. Additional, different, or fewer components may be provided.

The controller may be an engine control unit (ECU) 100a (or engine control module). In addition to internal engine instructions described in detail below, the ECU 100a generates instructions for breaker 25a-c to electrically connect and/or disconnect to bus 11a-c to provide electrical power to load 30a-c, respectively.

The controller may be a generator controller 100b. In addition to the internal commands discussed below, the generator controller 100b is configured to generate instructions for breaker 25a-c to electrically connect and/or disconnect to bus 11a-c to provide electrical power to load 30a-c, respectively.

The controller may be an alternator controller 100c. In addition to the internal alternator commands discussed below, the alternator controller 100c, is configured to generate instructions for breaker 25a-c to electrically connect and/or disconnect to bus 11a-c to provide electrical power to load 30a-c, respectively.

The controller may be a remote controller 100d. The remote controller 100d communicates with the genset 10 through the network 17. The remote controller 100d may also communicate with one or more other gensets 117, which may include similar components and functionality described with respect to genset 10. In addition to the remote monitoring and control functions for the genset 10 described below, the remote controller 100d is configured to generate instructions for breaker 25a-c to electrically connect and/or disconnect to bus 11a-c to provide electrical power to load 30a-c, respectively.

The engine 20 may be any type of engine 20 in which the combustion of a fuel with an oxidizer (e.g., air) in a chamber applies a force to a drive component (e.g., piston, turbine, or another component) of the engine 20. The drive component rotates or otherwise moves to perform work. The drive component may rotate the crankshaft.

A fuel tank stores fuel, which may be provided to the engine 20 from a fuel tank. The fuel tank may be internal to the engine 20. The fuel tank may be external to the engine 20 and provide fuel to the engine 20 through a pipeline. Either example may be referred to as a fuel supply. The fuel may be diesel or gasoline. A variety of gaseous fuels may be used. The gaseous fuels may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture, consisting primarily of methane.

Biogas may be a gas produced by the breakdown of organic material. A biosource may perform a chemical reaction on biomass and air to produce a gas that is provided to the engine 20. The biosource may include an anaerobic bacteria that processes the biomass. The biosource may be a component of a landfill, sewage facility, farm, or water treatment facility. The biosource may process animal wastes. The biosource may include a digester that stores the animal wastes and/or other organic material. The biosource may include a biogas reactor that produces a digested slurry and emits a waste gas.

In one embodiment, the fuel is delivered to a carburetor and mixed with the oxidizer prior to entering the combustion chamber. The carburetor may provide the mixture of fuel and oxidizer to the cylinders of the engine 20. In another embodiment, the fuel is delivered by a direct or indirect injection system.

The ECU 100a is also configured to provide instructions for subsystems of the engine 20. The ECU 100a receives data from a variety of sensors and provides instructions to other components of the engine. For example, the ECU 100a may receive sensor data from oxygen sensors, air to fuel ratio sensors, one or many throttle position sensors, and/or mass air flow sensors, as well as many other sensor types that could influence the performance of the engine. In some embodiments, the ECU 100a may calculate fuel injection commands sent to one or more fuel injectors in response to any aspect or combination of aspects of the sensor data. The ECU 100a may receive sensor data from a crankshaft position sensor and calculate idle speed timing in response to the sensor data. The ECU 100a may send instructions for engine timing to the fuel injectors to control fuel injections, the spark plugs to generate sparks for combustion in the cylinders of the engine, or to the valves of the engine to control when combustion cycles begin and end.

That is, combustion within the cylinders is caused by an ignition module of the ECU 100a igniting the fuel air mixture at the appropriate time during the cycle. For example, the ECU 100a may sent ignition commands to a spark plug or a glow plug. Timing of the ignition module may be operated by a flywheel as it rotates with the crankshaft relative to the ignition module through mechanical relation of the camshaft to a distributor or through electronic means. As a result of the combustion within the cylinders, the downward motion of the piston, coupled by the connecting, rotates the crankshaft to produce engine torque output. The camshaft includes lobes that relate the mechanical timing of the intake and exhaust valve positions with the piston's position within the cycle. The camshaft's rotation is due to direct coupling to the crankshaft or through electronic means (e.g. servo control). The camshaft may be associated with multiple cylinders (e.g., twin cylinders). Following combustion, the exhaust is directed out of the engine through exhaust piping and in some embodiments through a muffler before exiting the system.

The engine 20 may be four-stroke cycle engines, meaning four piston strokes make up a cycle, such as an Atkinson or Otto cycle. A cycle of the engine 20 includes an intake stroke, a compression stroke, a power stroke, and an exhaust stroke. During the intake stroke, the piston moves from the top of the cylinder to the bottom of the cylinder. In the case of a carbureted system, a fuel and air mixture is drawn into the cylinder by a vacuum, or in a non-atmospheric engine, it is forced into the cylinder. In other systems, such as direct or indirect injection, only the oxidizer enters the cylinder during the intake stroke. Next, during the compression stroke, the piston moves back to the top of the cylinder, compressing the fuel and air mixture into the combustion chamber. In the case of a direct injected system, the fuel is injected and/or atomized into the cylinder by a nozzle of the fuel injector. In other systems, fuel is already present from the intake stroke. Next, during the power stroke, the compressed fuel and air mixture is ignited by a spark plug or other heat source. The piston is pushed back down toward the bottom of the cylinder by the pressure. Finally, during the exhaust stroke, the piston returns to the top of the cylinder to expel the combusted fuel and air mixture through an exhaust valve.

The engine 20 may be a multiple cylinder engine or a single cylinder engine. The movement of the piston inside the cylinder is lubricated by the oil in the engine 20 that may be filtered. Other systems in the engine may include a fuel line, hose, or pipe, a retractable starter, a starter handle, an air cleaning system, a muffler, a governor system, turbocharger, exhaust gas recirculatory, catalyst, a throttle system, and others. The engine 20 may be air or liquid cooled. Rather than a radiator that houses cooling fluid that is pumped through the radiator, an air cooled engine includes one or more air paths through the engine that cool the engine. In some examples, the engine cylinder is cast with one or more fins that have a large surface area. As air blow across the cylinder and the fins, heat is removed from the engine. For liquid cooled, a variety of incompressible fluids such as propylene glycol, ethylene glycol, and water can be used in conjunction with a pump to circulate the fluid, a radiator to reject the heat, galleys in the engine for the cooling fluid to flow through, and associated piping.

In addition to dynamically controlling loads, the generator controller 100b may generate instructions at the generator level. The generator level instructions may include messages exchanged with other generators. For example, generator messages may coordinate an order for closing to the bus. The generator messages may include commands sent from genset 10 to another genset. For example, the generator controller 100b may perform a paralleling function with one or more other gensets. For example, when the load is above or below a threshold the generator controller 100b may generate a paralleling signal to bring an additional generator online to, for example, share the load or to increase system thermal efficiency. The instruction may cause genset 10 or another generator to close to the bus or begin running. The paralleling signal may include a time value in order to synchronize multiple generators, including setting an order for closing to the bus among the paralleling generators.

In electric power generators, synchronization is the process of matching the amplitude and frequency (in the case of single phase generators) or the amplitude, frequency, and phase order (in the case of multiple phases) of two or more generators connected in a network such as coupled to an electrical grid of a vehicle, a ship, a building or a utility. The generators cannot provide power to the electrical grid unless they are running at substantially the same output and substantially the same speed. More specifically, the two or more generators have substantially the same line voltage, frequency, phase sequence, and phase angle before being connected.

In one example, the following procedure for connecting two generators to a bus. First, the first generator is connected to the bus. Next, the other generator is brought up to speed. The speed may be the known synchronous speed of the first generator or based on a measurement from the electrical grid. After energizing the field of the second generator, the output is tested. The output of the second generator is measured and the phase is adjusted to match that of the electrical grid or the first generator. When the match is sufficient, the second generator is connected to the bus. Alternatively, to communicate the output between generators, the generators may exchange messages including a zero crossing message, a synchronization message, and a closing timing message. The messages may be relayed in a variety of techniques including analog signals, digital signals, and data packets that are switched on a network or directly transferred between the generators.

In addition to dynamically controlling loads, the alternator controller 100c may generate instructions internal to the alternator 15. For example, the alternator controller 100c may control an electrical parameter of the output of the alternator 15.

In one representation, the alternator 15 includes a rotor and a stator. The rotor has a field winding, which may be a series wound coil on a magnetically permeable core. The rotor may freely rotate within a stator, about a concentric axis. The stator consists of armature windings; these are sinusoidally distributed coils placed on the interior of a stack of ringed laminations. The laminations include slots for the placement of the armature windings. The clearance between the freely rotating rotor and the stationary stator is denoted as the air gap. The function of the synchronous alternator is to convert mechanical power from a driving mechanism into electrical power. The driving mechanism is denoted as the prime mover (e.g. internal combustion engine) and provides torque to the rotor. Electrical power is drawn from terminals crimped on to the ends of the armature windings. In order to convert mechanical power to electrical power, there is magnetic coupling between the rotor and stator.

The alternator controller 100c may receive sensor data from one or more sensors and in response, generate one or more alternator commands. The sensor data may be a measurement of an electrical parameter of the exciter armature or the field coil. The electrical parameter may include a current, a voltage, or a resistance. The electrical parameter may be a flux induced on the field coil assembly by a current in the armature windings. In this way, the sensor data may be indicative of an output of the generator. Further, because a load on the generator impacts the current in the armature windings, the sensor data may be indicative of the load on the generator. The sensor data may be temperature data, which may indicate the resistance of the field coils or armature windings.

The alternator controller 100c may perform an analysis of one or more components of the sensor data at the controller. For example, the alternator controller 100c may compare a value in the sensor data to a threshold. The alternator controller 100c may sort, average, or filter the sensor data. The alternator controller 100c may remove outlier values from the sensor data. The alternator controller 100c may calculate a moving average of the sensor data. The alternator controller 100c may query a lookup table using the sensor data.

The alternator controller 100c generates an alternator command at the alternator controller 100c based on the sensor data. The generator command may be an adjustment in a current in the field winding of the rotor, which directly affects the output of the generator. For example, the alternator controller 100c may compare an estimated output voltage or current of the generator to a threshold. When the output falls below a low threshold, the alternator controller 100c increases the current of the field windings. When the output exceeds a high threshold, the alternator controller 100c decreases the current of the field windings. The alternator command may adjust the speed of an engine driving the rotor of the generator. For example, the alternator controller 100c may compare an estimated output frequency of the generator to a threshold. When the output frequency falls below a low threshold, the alternator controller 100c increases the speed of the engine 20. When the output frequency exceeds a high threshold, the alternator controller 100c decreases the speed of the engine 20. The alternator controller 100c may also identify an anomaly from the sensor data and generate a command to shut down the genset 10 or issue a warning to the user.

In addition to dynamically controlling loads, the remote controller 100d may provide instructions for any of the engine 20, the alternator 15, or to a group of gensets including genset 10. Any of the engine commands described herein with respect to ECU 100a, generator controller 100b, or alternator controller 100c may be performed at an external device such as a server in communication with the genset 10 through the network 17. Messages may be exchanged between the remote controller 100d to provide sensor data and other parameters from the controller and return instructions generated at the remote controller 100d to the controller.

The communication may occur on a dedicated communication wire that extends between the generator controllers (e.g., serial cable, USB cable). The communication may occur over a wired computer network (e.g., Ethernet). The communication may be modulated to be transmitted over bus 110. In this example another communication path may be provided by the gensets and the bus 110 that bypasses the breaker. The communication may occur wirelessly such as a cellular network, the family of protocols known as Wi-Fi or IEEE 802.11, the family of protocols known as Bluetooth, or another protocol. Example wireless networks may include a wireless mesh network (e.g., Bluetooth mesh).

Figure 2:
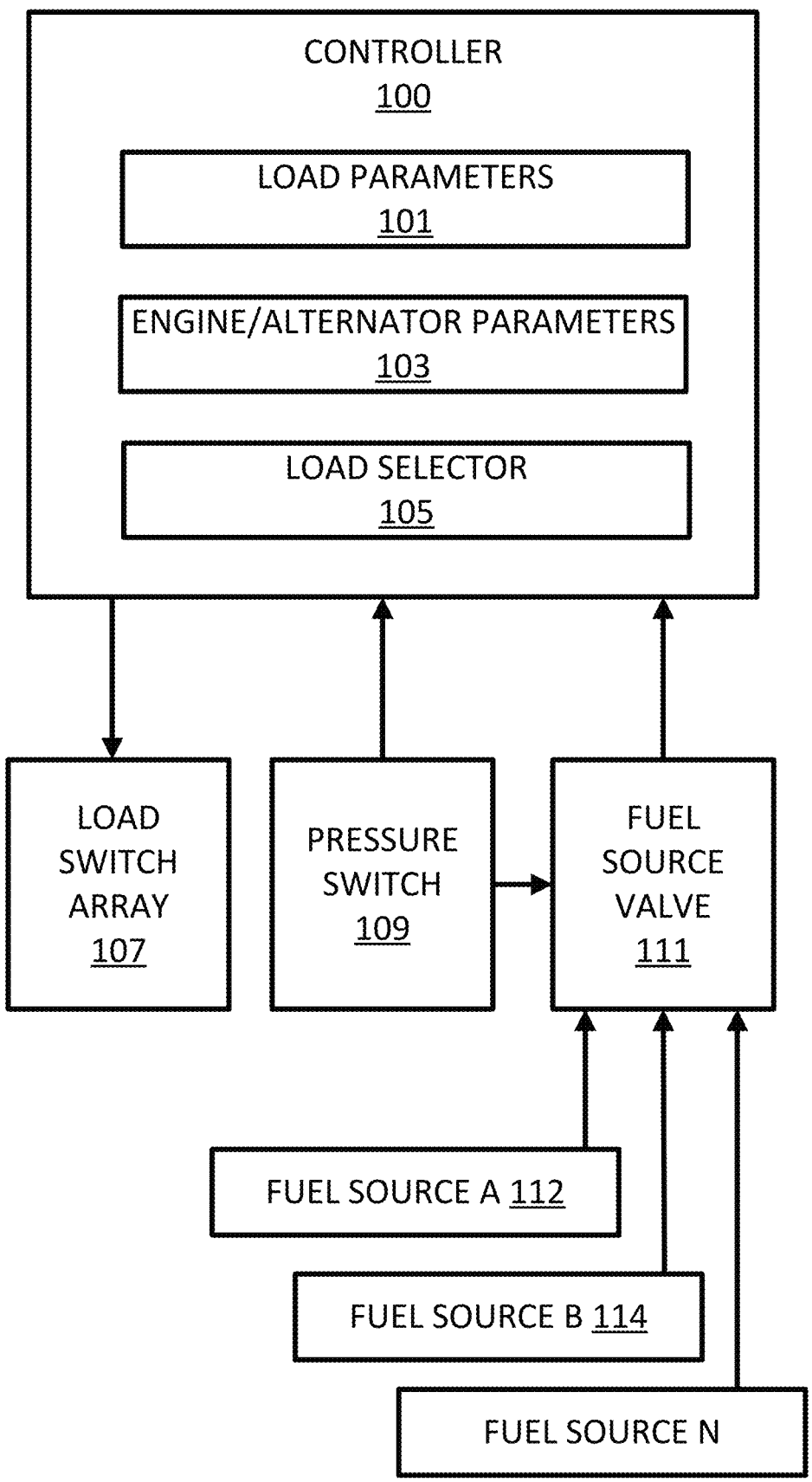
FIG. 2 illustrates a block diagram for a control system for dynamically controlling multiple loads on a generator.

FIG. 2 illustrates a block diagram for a control system for dynamically controlling a load on a generator. The controller 100, which may be any of the controllers of FIG. 1, includes load parameters 101, engine/alternator parameters 103, and a load selector 105. The controller 100 receives data from the pressure switch 109 and/or the fuel source valve 111. The controller 100 sends data to the load switch array 107. The fuel source valve 111 may be coupled to any number of fuel sources such as fuel source A 112 and fuel source B 114. Additional, different or fewer components may be included (e.g., any number of sources up to fuel source N).

The controller 100 receives fuel change data for a fuel for the genset 10. The fuel change data is indicative of a change in fuel type. The change may be from a first fuel (e.g., selected from the examples described herein) and a second fuel (e.g., also selected from the examples described herein). In one example, the change may be from natural gas to liquid propane. In at least certain types of engines different fuel types are compressible at different levels. For example, in a turbocharged engine, natural gas is more compressible than liquid propane and/or other fuels and also may be more knock resistant than liquid propane and/or other fuels. As a result, running the engine on natural gas results in the potential to produce more power, than running the engine on liquid propane. One of the primary fuel type and the secondary fuel type may be more compressible than the other. One fuel type may be more energy dense than the other fuel type. In one example comparison, diesel handles more load than natural gas, which handles more load the liquid propane, which handles more load the biogas.

The fuel change data may include pressure data, or be based on sensor data, from the pressure switch 109. The pressure switch 109 may detect a drop in pressure or otherwise a change in pressure such as a spike along a fuel line associated with or coupled to the genset 10. The change in pressure may indicate that primary (first) fuel is no longer being supplied. The change in pressure may indicate a malfunction in the fuel line or supply of the first fuel. For example, the fuel change data is an error received from a sensor associated with a fuel line associated with the generator. The pressure may increase, indicating a failure of the regulator.

The fuel change data may include a position (e.g., valve setting) of the fuel source valve 111. The valve setting may include an identifier of a fuel type associated with that position of the fuel source valve 111. The fuel source valve 111 may be a two-way valve that has two inputs (e.g., one input for the primary fuel and one input for the secondary fuel) and a single output that provides the fuel to the genset 10. Either or both of the primary fuel and the secondary (second) fuel may be gaseous. The primary fuel and/or the secondary fuel may be selected from the group comprising natural gas, liquid propane, diesel, biogas, gasoline, and ethanol.

The position of the fuel source valve 111 may be detected by a sensor at the valve. The position of the fuel source valve 111 may be a first position to supply the primary fuel or a second position to supply the secondary fuel. The fuel source valve may be a three-way valve or n-way valve where n is any integer supporting n fuel selections.

The fuel change data may include other sensor data, for example, for a sensor that detects the type of fuel entering the engine 20. The sensor may detect a characteristic of the fuel entering the engine 20 and determine the fuel type based on the characteristic. The controller 100 may compare the sensor data for a threshold or range of thresholds for the characteristic. When the sensor data is in a first range, the controller 100 identifies the first fuel type. When the sensor data is a second range, the controller 100 identifies the second fuel type. This continues for n fuel types. Example characteristics of the fuel that may be detected and used to determine fuel type include viscosity, density, dielectric constant, chemical reaction, and temperature.

The controller 100 identifies at least one load portion from the aggregate load associated with the change in fuel type based on the load parameters 101. The load may be selected according to a lookup table for the load parameters 101 stored at the controller 100 (e.g., in memory or a database). The lookup table may associate one or more loads with each of one or more fuel types. In other words, loads are paired with fuel types. Tables 1A and 1B provide examples of the lookup table for the load parameters 101. The controller 100 is configured to access a lookup table that associates the first fuel type with a first set of one or more loads and the second fuel type with a second set of one or more loads, as shown by Table 1.

TABLE 1A

| Fuel Type: | Fuel A | Fuel B |
|---|---|---|
| Compatible Load: | Loads 2, 4, 5 | Loads 1, 2, 3 |

TABLE 1B

| Fuel Type: | Fuel A (critical loads) | Fuel B (non-critical loads) |
|---|---|---|
| Compatible Load: | Loads 1, 2, 3, 4, 5 | Loads 1, 2, 3 |

In other examples, the fuel types are associated with a maximum power level for the aggregate load. The maximum power for the various fuels may be stored as load parameters 101. Table 2 includes an example lookup table for maximum power load parameters. The controller 100 compares the maximum power level to the aggregate loads to a priority list of loads. The priority list may be [Load A, power X; Load B, power Y; Load C, power Z; . . . , . . . ]. Table 3 provides a numeric example. The controller 100 may maintain connections with then loads through the load switch array 107 according to the priority list. For example, if the maximum power level is X+Y, the controller 100 selects loads to maintain from the beginning of the list including Load A and Load B, and the controller sheds load C. In this way, the controller 100 is configured to compare a priority list of loads to a maximum power level associated with the second fuel type.

In another example, the controller 100 compares each loads in the list to the maximum power level, and when the individual load is less than the maximum power level, that load is maintained. The maintained load is subtracted from the maximum power level (to calculate a remainder power level). When the next or subsequent load is more than the remaining maximum power level, that load is shedded or removed from the genset 10 through the load switch array 107 disconnecting a corresponding switch or breaker. It is possible that after a load that is shed in the priority list, another load that is less than the remainder power level and may be maintained. For example, in the example priority load above, it is possible that loads A and C are maintained while Load B is shed when Y is less than Z. The controller may also lock the order such that load C is not applied until load B can be accepted by the generator. If load A or C reduce to some value lower, such as A-I or B-I, where I is some reduction in load, then both loads will be maintained and load is applied to the bus.

TABLE 2

| Fuel Type: | Fuel A | Fuel B |
|---|---|---|
| Maximum Power: | 20 kW | 10 kW |

TABLE 3

| Load | Rated Power |
|---|---|
| A | 2 kW |
| B | 5 kW |
| C | 5 kW |
| D | 1 kW |

In other examples, the fuel types are associated with load types. Load types may be resistive loads, capacitive loads, inductive loads, and reactive loads. A resistive load or a capacitive load may include lights, heaters, and other equipment in which current leads voltage. An inductive load or a reactive load may include motors, solenoids, contactor coils, compressors, speakers, relays, transformers, or other load in which current lags voltage. The maximum power for the various fuels may be stored as load parameters 101. Table 4 includes an example set of load parameters 101 based on load type. The controller 100 is configured to access a lookup table that associates the primary fuel type with a first load type and the second fuel type with a second load type, as shown in Table 4.

TABLE 4

| Fuel Type: | Fuel A | Fuel B |
|---|---|---|
| Load Type: | Resistive, Reactive | Resistive |

In response to the change in fuel type, the load selector 105 calculates a dynamic load change command. The dynamic load change command may be determined by accessing the lookup table (load parameters 101) by querying the lookup table according to the change in fuel. The lookup table returns data indicative of the loads that can be retained or added for the new fuel. The load selector 105 provides the dynamic load change command to the load switch array 107.

In other words, the controller 100 generates a switch command for at least one switch in the load switch array 107 coupled to at least one load in response to the change in fuel type. The switch command may instruct the load switch array 107 to shed at least one load from the generator. The switch command may instruct the load switch array 107 to couple at least one load from the generator.

The engine/alternator parameters 103 may include data indicative of the operation of the specific engine 20 and/or alternator 15 under different fuels, which may be translated into the load parameters 101 by the controller. For example, the engine 20 may operate at a different combustion cycle timing, intake pressures, or have different peak efficiency speeds depending on the fuel. In another example, the run time of the engine 20 may be regulated differently according to the fuel type. The alternator 15 may produce an output with different electrical characteristics according to the fuel type. The controller may generate or modify the load parameters based on the engine/alternator parameters 103.

Figure 3:
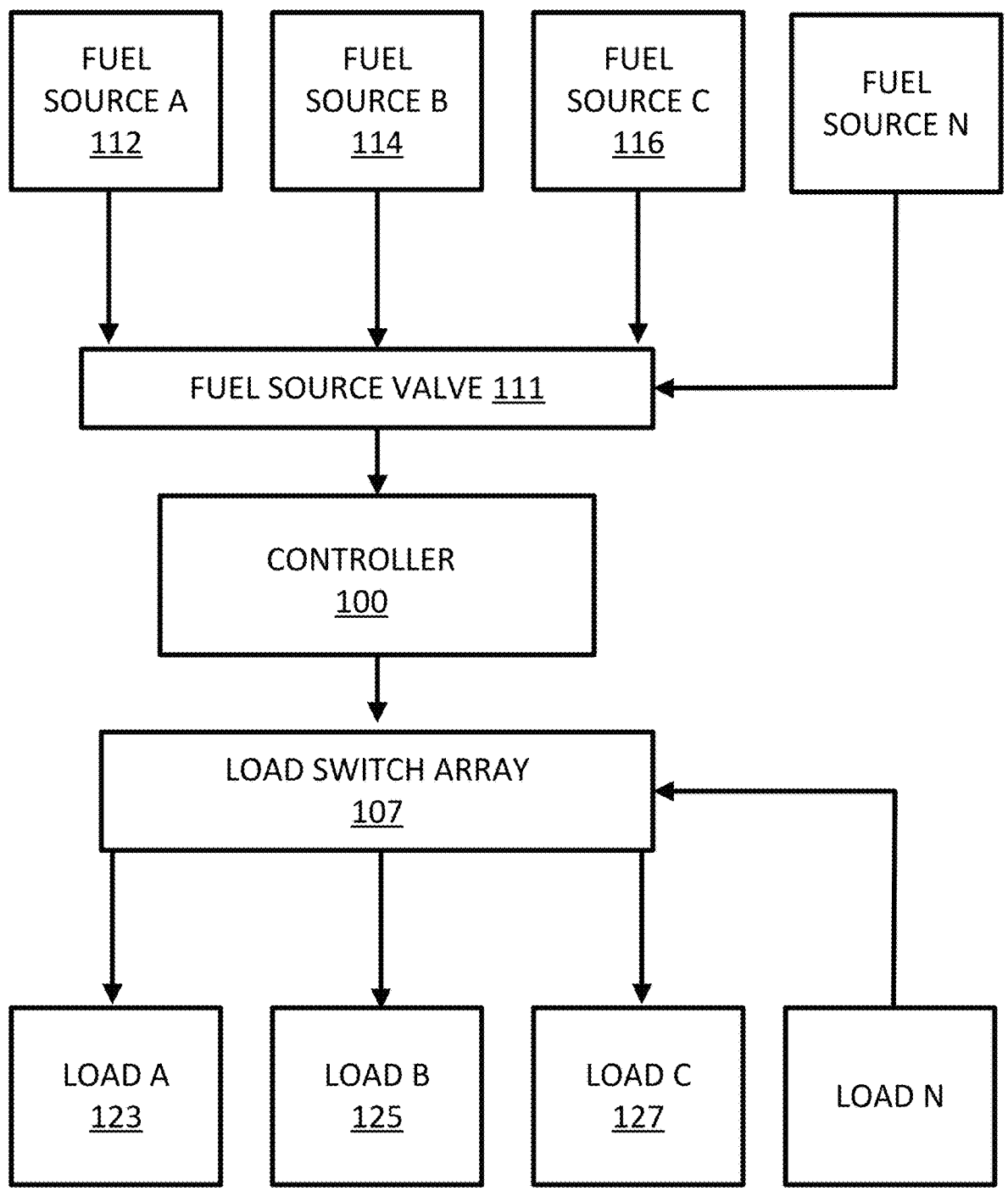
FIG. 3 illustrates an example block diagram for dynamically controlling a load on a generator with three loads and three fuel sources using a controller.

FIG. 3 illustrates an example block diagram for dynamically controlling a load on a generator with three loads (load A 123, load B 125, and load C 127) and three fuel sources (fuel source A 112, fuel source B 114, and fuel source C 116) using the controller 100. The loads may be portions into any quantity. The engine 20 may be a tri-fuel engine configured to operate selectively and alternatively on all three fuel sources. The engine 20 may be a quad-fuel engine configured to operate selectively and alternatively on four fuel sources. Other numbers of fuel sources (e.g., up to fuel source N) may be used. Other loads may be included (e.g. up to load N).

Figure 4:
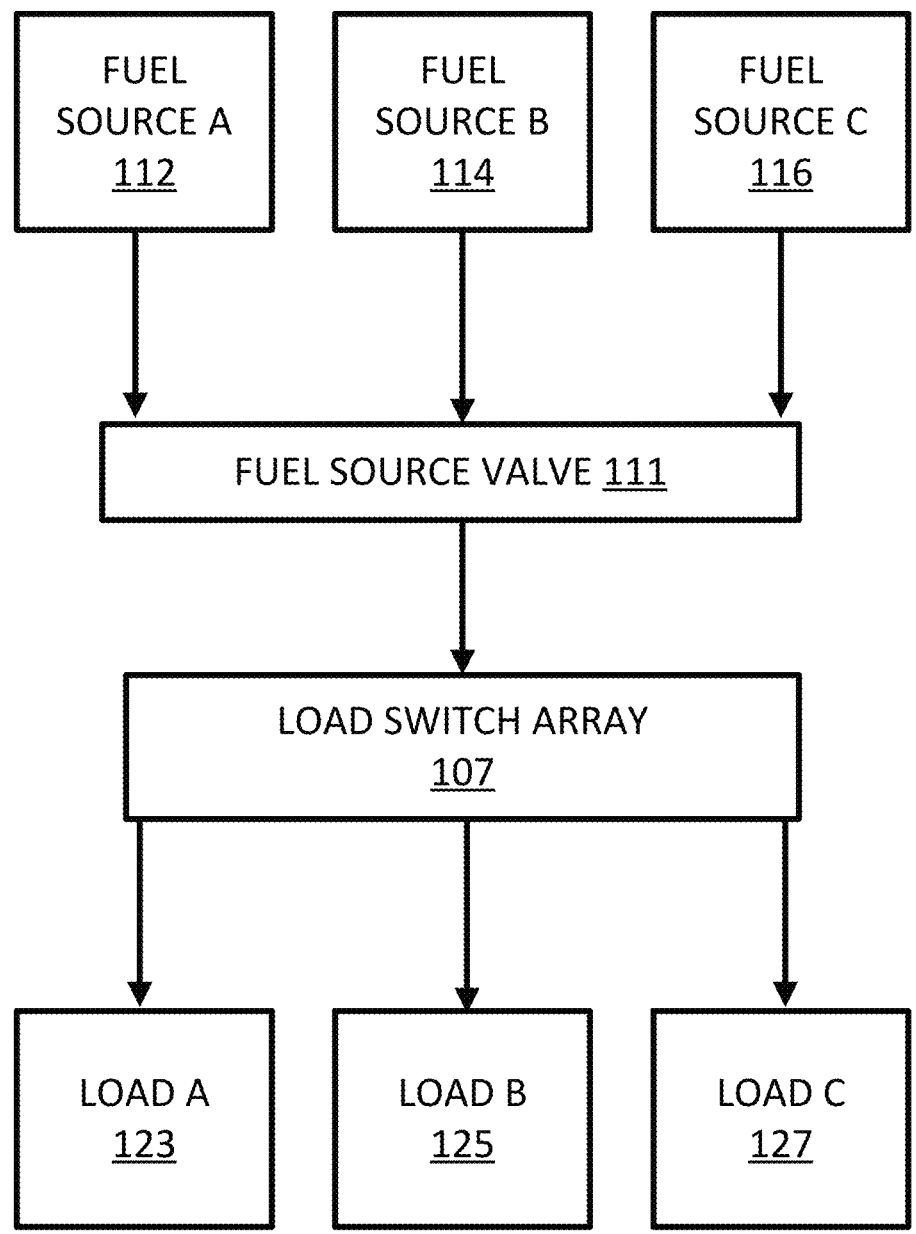
FIG. 4 illustrates an example block diagram for dynamically controlling a load on a generator with three loads and three fuel sources using a direction connection between a fuel valve and a load switch.

FIG. 4 illustrates an example block diagram for dynamically controlling a load on a generator with three loads and three fuel sources using a direct connection between a fuel source valve 111 and a load switch array 107. The embodiment of FIG. 4 omits the controller 100. Instead, the setting of the fuel source valve 111 causes the load switch array 107 to change settings for the load (i.e., connect or disconnect one or more loads). In one example, a mechanical link connects the fuel source valve 111 to the load switch array 107, which may be a breaker. The movement of the fuel source valve 111 is transferred using the mechanical link to actuate the breaker. In one example, an electrical link connects the fuel source valve 111 to the load switch array 107. The movement of the fuel source valve 111 may trigger an electrical switch connected to a relay that actuates the breaker. Other links between the fuel source valve 111 to the load switch array 107 are possible. Other numbers of fuel sources (e.g., up to fuel source N) may be used. Other loads may be included (e.g. up to load N).

Figure 5:
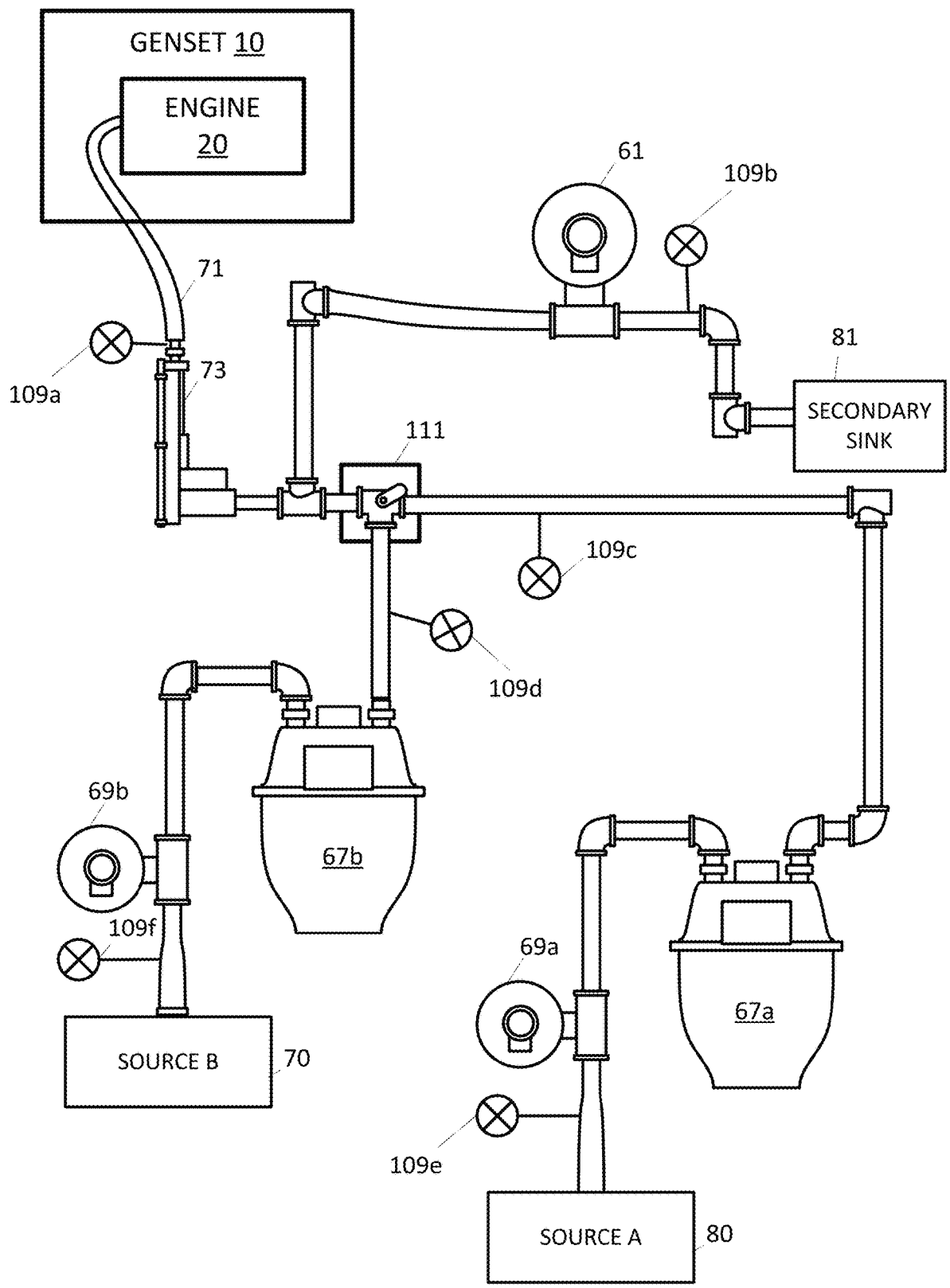
FIG. 5 illustrates a fuel delivery system for the systems of FIGS. 1 and 2.

FIG. 5 illustrates a fuel delivery system for the systems of FIGS. 1 and 2. The fuel supply path may be coupled to the chassis of the fuel delivery system of the genset 10 to provide fuel to the engine 20. The fuel supply path may include an engine fuel supply line 71 and demand regulator 73 connected to the fuel source valve 111. A reducer may also be downstream of the fuel supply valve 111. The fuel supply valve 111 connects the genset 10 to both source A and source B. Another connection 63 may lead to a home or another device that uses the fuel (e.g., secondary sink 81).

Each of the sources A and B may be coupled to at least one regulator and/or at least one meter. For example, a meter 67a and a regulator 69a are upstream of the source 80 (between fuel source valve 111 and the source 70) and meter 67b and regulator 69b are upstream of the source 70 (between fuel source valve 111 and the source 80). Various supply lines provides fuel from the sources (e.g., tank or utility provider). The fuel source valve 111 is configured to switch between fuel source 80 and fuel source 70.

The regulators are pressure regulators configured to control the fuel supply and/or decompress the fuel stored at high pressure. The pressure regulators supply the fuel to the first chamber at a specific pressure. Any of the pressure regulators may be electronic and receive a control signal from the controller. In electronic pressure regulators, the specific pressure may be controlled by a setting made through a control panel or the ECU 100a. Any of the pressure regulators may be mechanical and include a diaphragm that is pushed against a spring to open and close a valve of a regulating orifice. In mechanical pressure regulators, the specific pressure may be controller by a manual dial, dip switch, or an adjustment handle. Additional, different, or fewer components may be provided. For example, only one regulator may be used.

When the fuel source valve 111 changes from source 80 to source 70, the pressure change is detectable at the pressure sensor 109. The pressure sensor 109 may be included in one or more various locations in the fuel deliver system. One or more pressure sensors illustrated may be included. For example, pressure sensor 109a is coupled to the fuel supply line 71 of the genset 10, pressure sensor 109b is coupled to the secondary sink 81 (e.g., between the secondary sink and the fuel source valve 111), pressure sensor 109c is coupled to the fuel source valve 111 on the supply line from the source 80 (e.g., between the meter 67a and the fuel source valve 111), pressure sensor 109d is coupled to the fuel source valve 111 on the supply line from the source 70 (e.g., between the meter 67b and the fuel source valve 111), pressure sensor 109e is coupled near the source 80 (e.g., between source 80 and the regulator 69a), and pressure sensor 109f is coupled near the source 70 (e.g., between source 70 and the regulator 69b).

Figure 6:
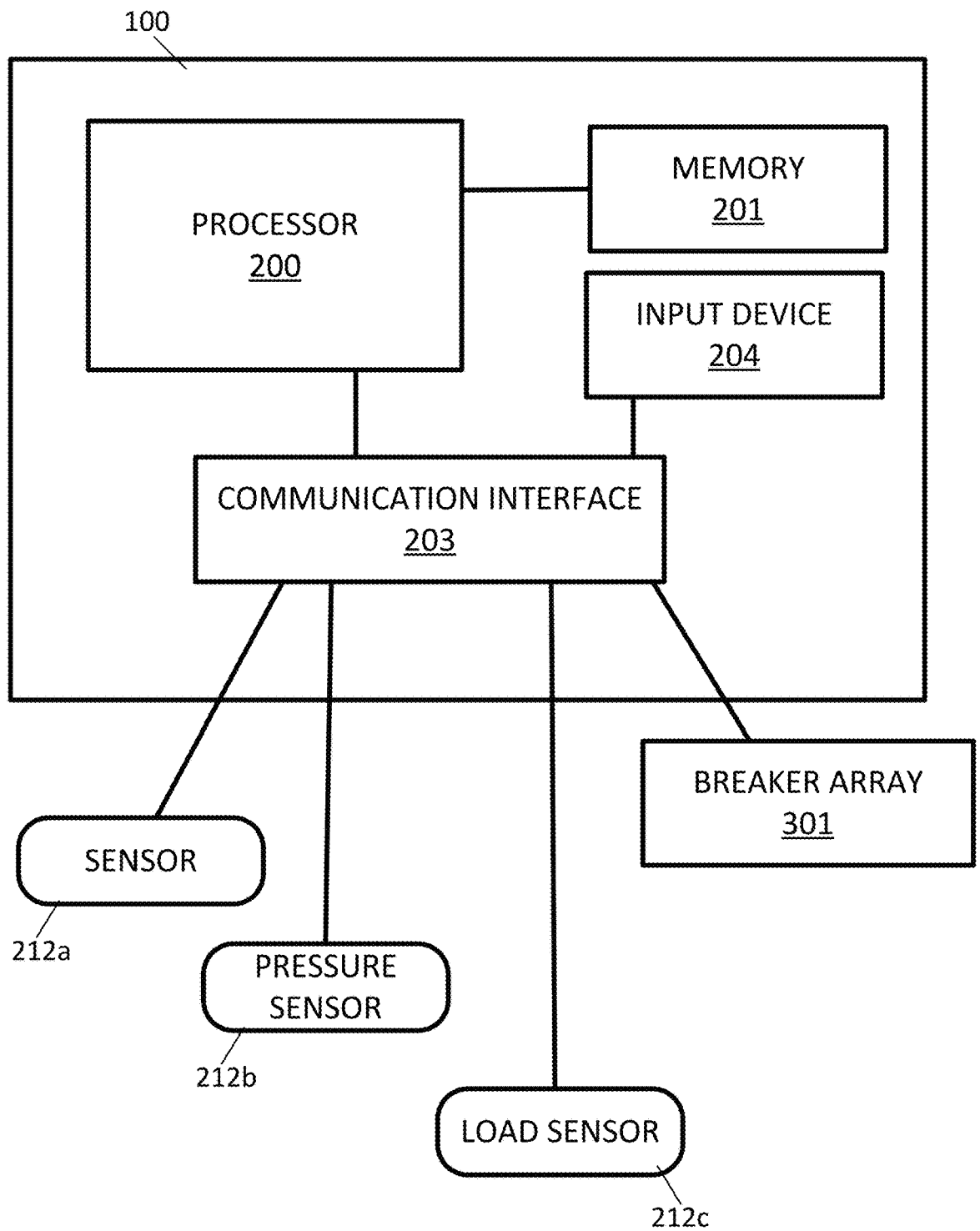
FIG. 6 illustrates a controller for the systems of FIGS. 1 and 2.
Figure 7:
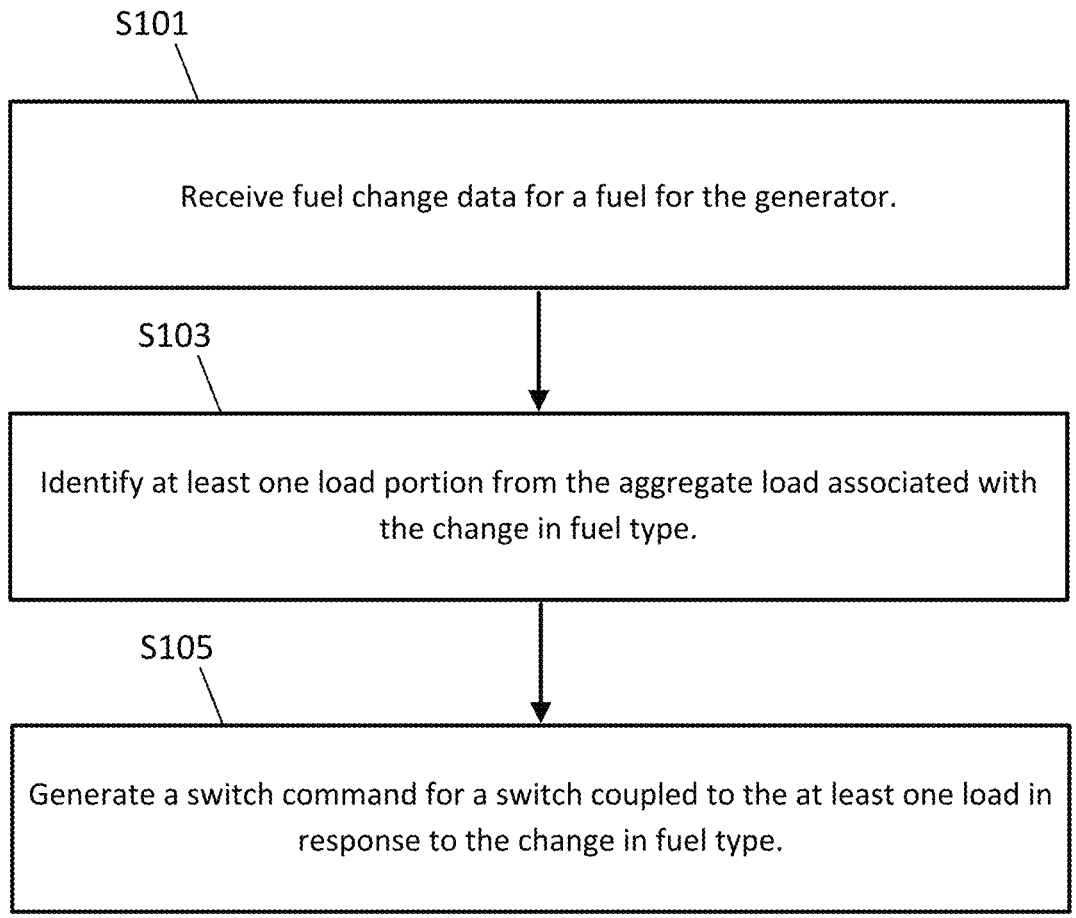
FIG. 7 illustrates an example flow chart for the operation of the controller.

FIG. 6 illustrates a controller 100 for the systems of FIGS. 1-6. The controller 100 may include a processor 200, a memory 201, an input device 204, and a communication interface 203. The communication interface 203 may communicate with one or more sensors such as sensor 212a, pressure sensor 212b, and load sensor 212c and one or more switches or breakers in breaker array 301. Additional, different, or fewer components may be included. FIG. 7 illustrates an example flow chart for the operation of the controller of FIG. 6. Additional, different, or fewer acts may be included.

At act S101, the processor 200 receives fuel change data for a fuel for the generator. The fuel change data is indicative of a change in fuel type determined by a sensor. For example, the sensor may be the pressure sensor 212b associated with a fuel line that is activated by a change in a valve. The pressure in the fuel line indicates that fuel is flowing through it and that the fuel source for the engine of the generator has been changed. Alternatively, the sensor 212a may detect the operation of another component associated with the fuel change. For example, the sensor 212a may detect movement in a valve. Alternatively, the sensor 212a may detect the change in weight of a fuel tank or intermediary tank including the fuel. The sensor 212a may detect one or more characteristics of the fuel itself (e.g., a capacitive sensor).

The processor 200 may include circuitry or a module or an application specific controller as a means for receiving fuel change data for a fuel for the generator. The memory 211 is an example means for storing the sensed fuel change data.

At act S103, the processor 200 identifies at least one load portion from the aggregate load associated with the change in fuel type. The processor 200 may perform a lookup from memory 201 where the fuel types are associated with specific loads or breakers (switches) that correspond to specific loads.

The processor 200 may include circuitry or a module or an application specific controller as a means for identifying at least one load portion from the aggregate load associated with the change in fuel type.

At act S105, the processor 200 generates a switch command for a breaker or switch coupled to the at least one load in response to the change in fuel type. The processor 200 may identify the loads that are connected to the generator based on load sensor 212c. The load sensor 212a may detect power, current, and/or voltage associated with breakers in the breaker array 301. Based on that detection, the processor 200 determines which loads are available to disconnect or shed and/or the amount of power drawn by the loads. The processor 200 may include circuitry or a module or an application specific controller as a means for generating a switch command for a switch coupled to at least one load in response to the change in fuel type.

Figure 8:
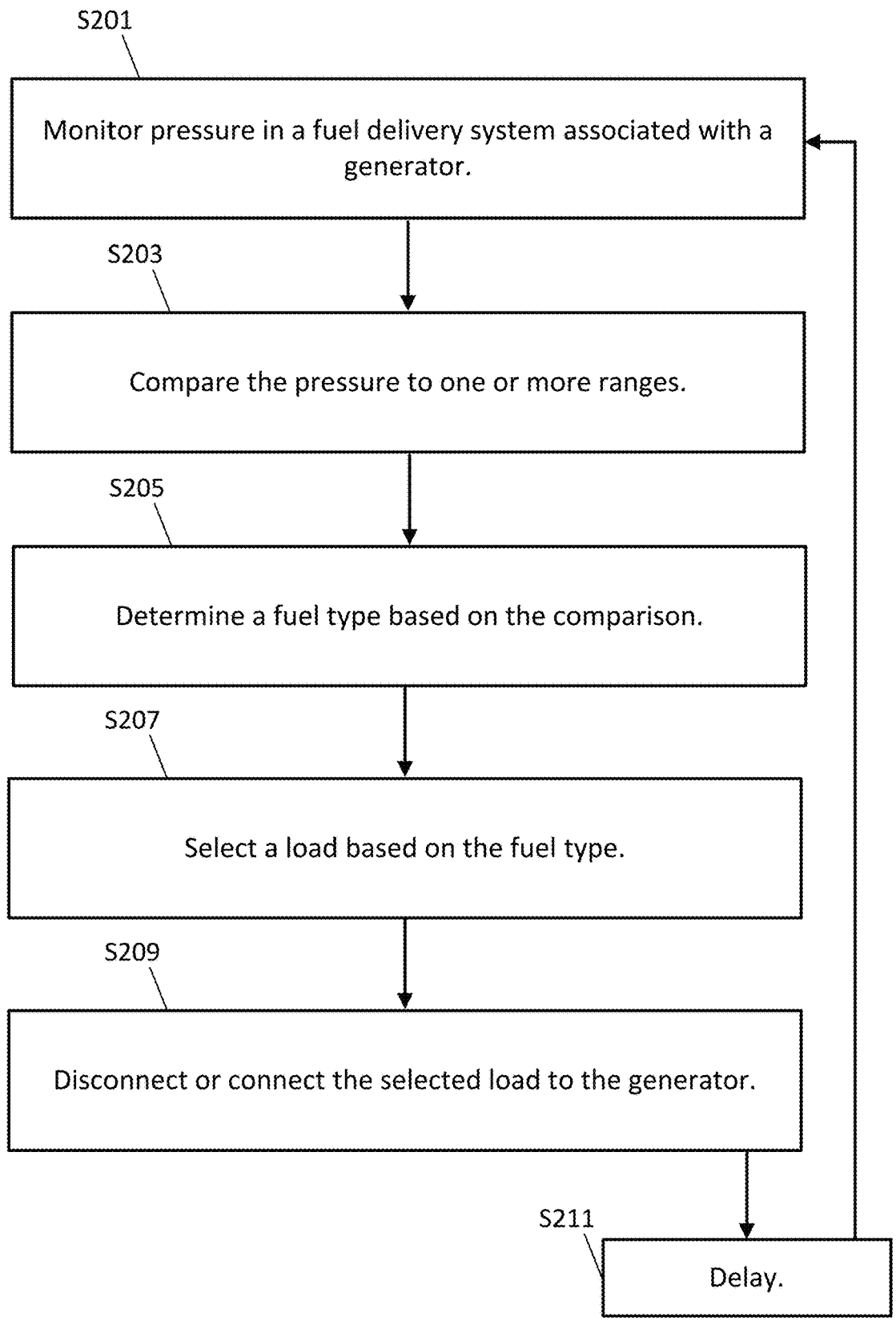
FIG. 8 illustrates another example flow chart for the operation of any of the systems of FIGS. 1-7.

FIG. 8 illustrates another example flow chart for the operation of the systems of FIGS. 1 and 2. The acts of FIG. 8 may be performed by the controller 100. In another example, the acts may be performed by any combination of the ECU 100a, the generator controller 100b, the alternator controller 100c, or the remote controller 100d. Additional, different, or fewer acts may be included.

At act S201, pressure is monitored in a fuel delivery system. The pressure may be described by pressure data from a sensor. The pressure may be monitored at the fuel injectors of the engine. The pressure may be monitored at a fuel inlet or fuel supply internal to the engine (or generator). The pressure may be monitored at a fuel tank of the engine (or generator). The pressure data corresponds to a utility fuel supply connected to the generator. When the pressure changes, this is an indication that the source of fuel may need to change. The pressure from multiple sensors may be monitored concurrently and/or simultaneously.

At act S203, the monitored pressure are compared to one or more predetermined ranges. Each of the predetermined ranges may be associated with a different fuel type. The predetermined ranges may be absolute ranges (e.g., pressure in a fuel line) or relative ranges (e.g., change in pressure of a fuel tank). A predetermined range may correspond to any change in pressure.

At act S205, a fuel type is determined based on the comparison. The memory 201 may store a matrix that associates different fuel types with different pressure levels. The processor 200 accesses the matrix according to the comparison of the monitored pressure to the one or more predetermined ranges.

At act S207, a load or loads are selected based on the fuel type. The memory 201 may store a matrix that associates different fuel types with different breakers. The processor 200 accesses the matrix according to the fuel type and receives a breaker setting (e.g., for one or more breakers in breaker array 301). In one example, the memory 201 stores a matrix that associates different pressure levels with breaker settings. In this way, the processor 200 does not actually identify fuel type. The processor 200 selects a breaker setting directly from the pressure measurement. The controller 100 sends a signal, at act S209, to actuate at least one breaker in breaker array 301 so that the load portion is connected to or disconnected from the generator.

At act S211, the process delays for a predetermined amount of time. The predetermined amount of time may be selected to avoid immediately disconnecting or reconnecting the same load or another load. The predetermined amount of time may be user defined. The predetermined amount of time may be 1 minute. The predetermined amount of time may depend on generator type, engine type, or fuel type. The predetermined amount of time may depend on load type. After the delay, the process returns to act S101.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a Secure Digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a keypad, a touchscreen, or other structure configured to allow a user to enter data such as pressure threshold, pressure ranges, load connections, fuel connections, or other settings. The input device 204 may receive data from the user for modifying or creating the lookup table that associates pressure change with fuel type. The input device 204 may receive data from the user for modifying or creating the lookup table that associates fuel type with breaker settings.

The input device 204 may include a connection to a network, a smartphone, a tablet, a personal computer, or various other input/output devices configured to electronically transmit the trigger command to the control system. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for dynamically controlling an aggregate load on a generator, the method comprising:
receiving fuel change data for a fuel for the generator, wherein the fuel change data is indicative of a change in fuel type from a first fuel type to a second fuel type as determined by a sensor;
identifying, based on a lookup table that associates the first fuel type with a first set of one or more loads and the second fuel type with a second set of one or more loads, the second set of one or more loads from the aggregate load associated with the change in fuel type; and
generating a switch command for a switch coupled to the at least one load corresponding to the first set of one or more loads or the second set of one or more loads in response to the change in fuel type.

2. The method of claim 1, wherein the switch command sheds the at least one load from the generator.

3. The method of claim 1, wherein the switch command couples the at least one load to the generator.

4. The method of claim 1, wherein the change in fuel is from a first fuel type to a second fuel type.

5. The method of claim 4, wherein the first fuel type and the second fuel type are each selected from a group comprising natural gas, liquid propane, diesel, biogas, or ethanol.

6. The method of claim 4, wherein the first fuel type is associated with an internal tank and the second fuel type is associated with an external fuel supply.

7. The method of claim 4, wherein the first fuel type is more energy dense than the second fuel type.

8. The method of claim 1, wherein the fuel change data describes a valve setting for a valve coupled to the generator.

9. The method of claim 1, wherein the fuel change data is an error received from the sensor associated with a fuel line associated with the generator.

10. The method of claim 9, wherein the sensor is a pressure sensor configured to detect a change in pressure for the fuel line associate with the generator.

11. The method of claim 1, wherein the change in fuel is from natural gas to liquid propane or from liquid propane to natural gas.

12. A fuel delivery system for dynamically controlling an aggregate load on a generator, the fuel delivery system comprising:
a switch configured to couple a plurality of loads for the aggregate load to the generator;
a sensor configured to generate fuel change data for a fuel for the generator, wherein the fuel change data is indicative of a change in fuel type; and
a controller configured to identify at least one load from the plurality of loads associated with the change in fuel type and generate a switch command for a switch coupled to the at least one load in response to the change in fuel type, wherein the change in fuel type is from a first fuel type to a second fuel type and the controller is configured to access a lookup table that associates the first fuel type with a first load type and the second fuel type with a second load type.

13. The fuel delivery system of claim 12, wherein the first load type is a resistive load or an inductive load.

14. An apparatus for dynamically controlling an aggregate load on a generator, the apparatus comprising:
a communication interface configured to receive pressure data for a gaseous fuel for the generator, wherein the pressure data is indicative of a change in a gaseous fuel type; and
a controller configured to identify at least one load associated with the gaseous fuel type and generate a switch command for a switch coupled to the at least one load in response to the change in gaseous fuel type, wherein the change in gaseous fuel type is from a first fuel type to a second fuel type and the controller is configured to access a lookup table that associates the first fuel type with a first load type and the second fuel type with a second load type.

15. The apparatus of claim 14, wherein the pressure data corresponds to a fuel supply of an engine for the generator.

16. The apparatus of claim 14, wherein the pressure data corresponds to a fuel tank of the generator.

17. The apparatus of claim 14, wherein the pressure data corresponds to a utility fuel supply connected to the generator.

* * * * *